US008483745B2

(12) United States Patent
Furueda et al.

(10) Patent No.: US 8,483,745 B2
(45) Date of Patent: Jul. 9, 2013

(54) WIRELESS COMMUNICATION SYSTEM AND WIRELESS COMMUNICATION METHOD, AND BASE STATION APPARATUS

(75) Inventors: Koichiro Furueda, Yokohama (JP); Mikio Kuwahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 460 days.

(21) Appl. No.: 12/766,694

(22) Filed: Apr. 23, 2010

(65) Prior Publication Data

US 2010/0272018 A1   Oct. 28, 2010

(30) Foreign Application Priority Data

Apr. 27, 2009 (JP) .................................. 2009-107288

(51) Int. Cl.
*H04B 7/00* (2006.01)
*H04B 17/02* (2006.01)
*H04B 7/185* (2006.01)
*H04J 3/16* (2006.01)

(52) U.S. Cl.
USPC ............ 455/525; 455/135; 370/465; 370/318

(58) Field of Classification Search
USPC ................. 455/447, 450, 451, 13.4, 524, 525, 455/703, 101, 115.3, 134, 135, 68, 69, 453, 455/446; 370/329, 328, 332, 341, 344, 295, 370/319, 203, 208–210
See application file for complete search history.

(56) References Cited

U.S. PATENT DOCUMENTS

| | | | | |
|---|---|---|---|---|
| 7,796,563 | B2* | 9/2010 | Wu et al. ......................... | 370/335 |
| 7,940,690 | B2* | 5/2011 | Yoon .............................. | 370/252 |
| 2007/0104164 | A1* | 5/2007 | Laroia et al. ................... | 370/338 |
| 2007/0140168 | A1* | 6/2007 | Laroia et al. ................... | 370/330 |
| 2008/0057934 | A1 | 3/2008 | Sung et al. | |
| 2009/0042579 | A1 | 2/2009 | Kitajima | |

FOREIGN PATENT DOCUMENTS

| | | |
|---|---|---|
| JP | 2008-061250 A | 3/2008 |
| JP | 2009-021787 A | 1/2009 |
| JP | 2009-044397 A | 2/2009 |

OTHER PUBLICATIONS

3GPP TS36.331 V8.5.0, pp. 113-134, (2009).
Mobil WiMax-Part I: A Technical Overview Performance Evaluation, Section 4.2: "Fractional Frequency Reuse", pp. 27-29.
*IEEE* 802.16m-08/00 3r6, Section 20.1: "Interference Mitigation Using Fractional Frequency Reuse", pp. 147-151, (2008).
*IEEE* 802.16m System Description Document *IEEE* 802.16m-08/00 3r6, Section 20.2.2: "Multi-ABS Joint Antenna Processing", pp. 153-154, (2008).
Combined Coordinated Scheduling and Joint Transmission for LTEA; 3GPP TSG-RAN WG1 #56bis, Seoul, South Korea, Mar. 23-27, 2009; pp. 1-5.

(Continued)

*Primary Examiner* — Hanh N Nguyen
(74) *Attorney, Agent, or Firm* — Foley & Lardner LLP

(57) ABSTRACT

The present invention pertains to the technology for avoiding interference between adjacent frequencies occurring on cell boundaries or sector boundaries in a mobile wireless communication system using an OFDMA (Orthogonal Frequency Division Multiple Access) scheme. There are a single sector mode of no collaboration between sectors; a sector selection mode of collaborating between sectors to transmit with a specified frequency resource from only one sector, and a collaboration mode of collaborating between sectors to transmit signals from both sectors. Any of the three modes is selected on the basis of measurement results of RSRP (Reference Signal Received Power) reported from a mobile station.

5 Claims, 10 Drawing Sheets

OTHER PUBLICATIONS

3rd Generation Partnership Project; Technical Specification Group Radio Access Network; Evolved Universal Terrestrial Radio Access (E-UTRA) Radio Resource Control (RRC); Protocol specification (Release 8); 3GPP TS 36.331 V8.5.0 (Mar. 2009); pp. 1-10, 56-72.

English translation of Japanese office action on application 2009-107288 issued Oct. 30, 2012; pp. 1-2.

* cited by examiner

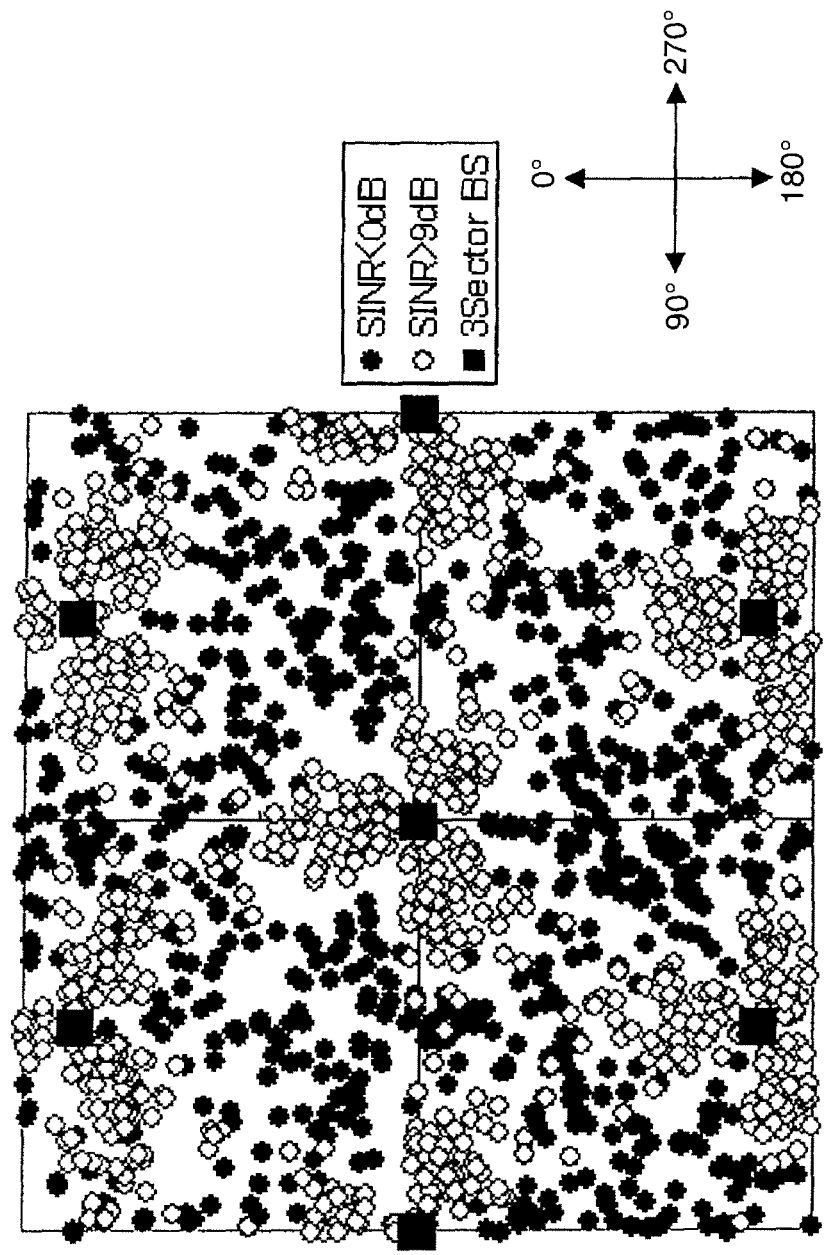

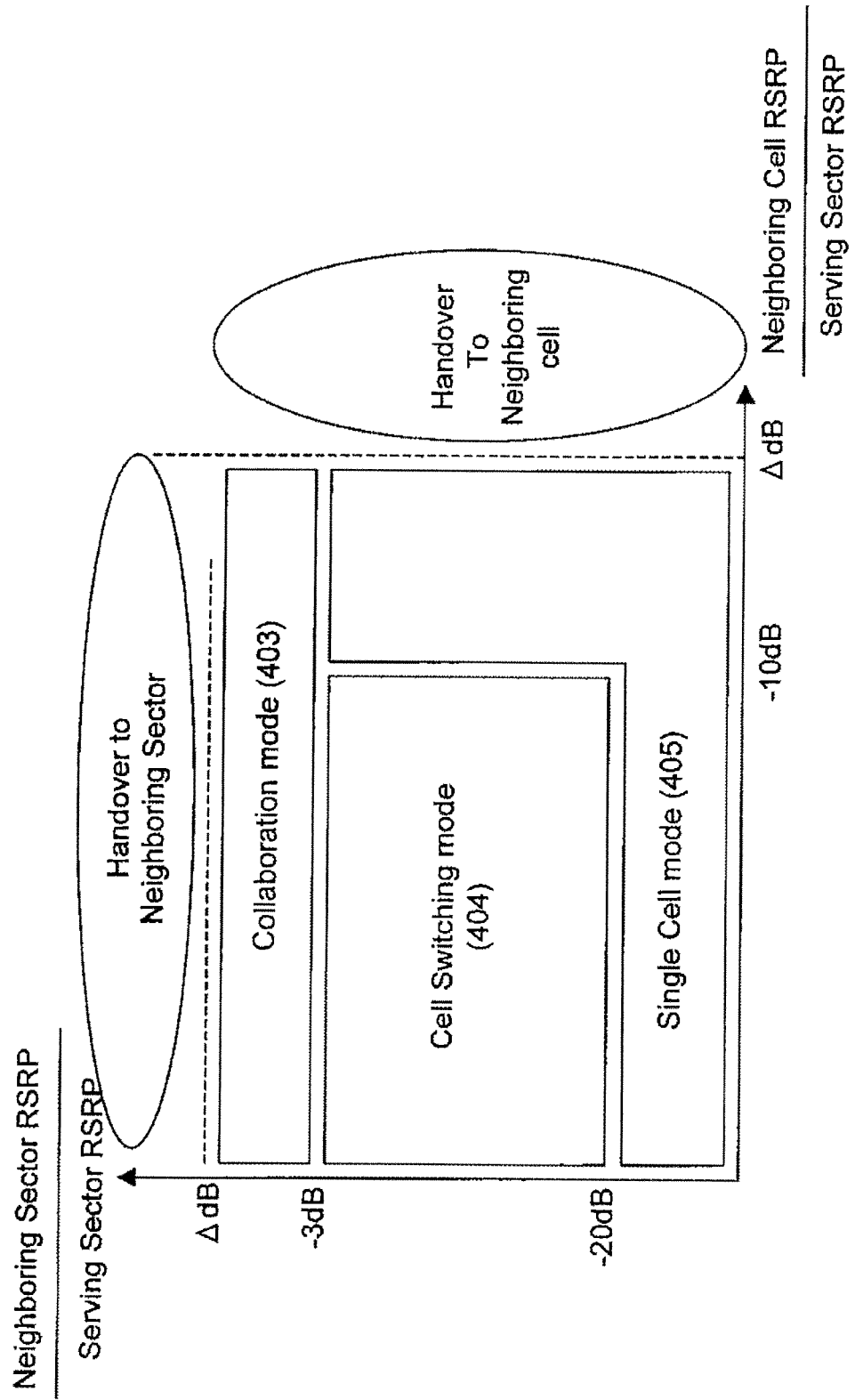

WIRELESS COMMUNICATION SYSTEM AND WIRELESS COMMUNICATION METHOD, AND BASE STATION APPARATUS

INCORPORATION BY REFERENCE

The present application claims priority from Japanese application JP 2009-107288 filed on Apr. 27, 2009, the content of which is hereby incorporated by reference into this application.

BACKGROUND OF THE INVENTION

The present invention pertains to the mobile wireless communication technology and pertains in particular to the technology for avoiding interference between adjacent frequencies occurring on cell boundaries or sector boundaries in a mobile wireless communication system using an OFDMA (Orthogonal Frequency Division Multiple Access) scheme.

Accompanying with the advancement of mobile wireless communication technology, it is expected that a ubiquitous network will be implemented which releases users from the constraints of the location and moving velocity when using a mobile station and with which users can connect more freely, anytime and anywhere.

A mobile wireless communication system comprises a plurality of base station apparatuses and a plurality of mobile stations communicating wirelessly with the base station apparatuses. The plurality of base station apparatuses are arranged decentrally to form areas called "cells" where wireless communication is possible, in ranges where radio waves transmitted from the respective base station apparatuses can reach. Using a directional antenna, a base station apparatus may also divide a cell angularly into a plurality of ranges called "sectors" where radio wave can reach. As a sector configuration, three-sector configuration dividing a cell into three, and six-sector configuration dividing a cell into six are common. It is also possible to consider a sector divided angularly using the directivity of the antenna as a cell, and what includes both concepts is often called a "cell" in the present invention.

A wireless communication system is provided with a mechanism for continuing the communication by repeating handover between base station apparatuses in response to the movement of a mobile station. In this way, cells formed respectively by a plurality of base station apparatuses overlap so that the wireless communication system can maintain wireless communication even if the mobile station moves. In the overlapping area formed by two base station apparatuses, wireless communication between the mobile station and one base station apparatus of them interferes with the communication of the other one. Interference is radio waves disturbing the communication of the mobile stations, and causes signal quality degradation or throughput degradation in wireless communication.

For example, the technology for avoiding or controlling inter-cell interference is disclosed in JP-A-2008-061250, JP-A-2009-021787, and JP-A-2009-044397.

On the one hand, in terms of standardization, 3GPP (Third Generation Partnership Project) which is one of standards bodies proposes a wireless scheme based on the OFDM (Orthogonal Frequency Division Multiplexing) scheme called "LTE (Long Term Evolution)." The document 3GPP TS36.331 6.3.2 (Radio resource control information elements) discloses the technology for changing the antenna transmission mode of a mobile station via an instruction from a base station in LTE.

On the other hand, the IEEE which is another standards body proposes in IEEE 802.16e, a wireless scheme based on OFDM called "Mobile WiMax (Mobile Worldwide Interoperability for Microwave Access)", and IEEE 802.16m advocates the technology called "FFR (Fractional Frequency Reuse)" in the document Mobile WiMax-Part I: A Technical Overview Performance Evaluation, Section 4.2: "Fractional Frequency Reuse".

IEEE 802.16m discusses FFR also in the IEEE 802.16m System Description Document IEEE 802.16m-08/00 3r6, Section 20.1: "Interference Mitigation Using Fractional Frequency Reuse". Another section of the same document, IEEE 802.16m System Description Document IEEE 802.16m-08/00 3r6, Section 20.2.2: "Multi-ABS Joint Antenna Processing" describes network MIMO (Multiple Input Multiple Output) in which a plurality of base stations cooperate.

SUMMARY OF THE INVENTION

Technologies for reducing or controlling interference occurring in cell boundary areas where a plurality of cells overlap are disclosed in the prior technology references. These technologies have been devised to reduce or control interference in a normal situation where mobile stations are distributed uniformly inside the cells. However, in actual operation, the distribution of mobile stations is not expected to be uniform and, further, due to causes such as buildings and geographical features, cell shapes are actually very complex. As a result, if it is possible to grasp the state of each mobile station and individually carry out the interference control that is considered to be most effective with respect to each mobile station, interference occurring in cell boundary areas can be substantially improved.

The present invention has been made in order to solve the above problems, and its object is to implement inter-cell interference control suited to the state of each mobile station.

In order to solve the above problems, the present invention is devised so that:

said base station apparatus having a sector configuration transmit in advance a measurement report configuration from a first sector to a mobile station connected with said first sector, the measurement report containing information pertaining to the reception condition from sectors and base station apparatuses that said mobile station can receive, wherein said mobile station, in accordance with the measurement report configuration received from said first sector, measures the information pertaining to reception condition from sectors and base station apparatuses that said mobile station can receive, and transmits said measurement report to said first sector; and said base station, when receiving the measurement report from said mobile station connected with said first sector, decides, on the basis of contents of said measurement report, a transmission method for controlling interference from sectors and base station apparatuses other than said first sector to said mobile station, and transmits a signal with the decided transmission method to said mobile station.

According to the present invention, it is possible to implement inter-cell interference control suited to the state of each mobile station. As a result thereof, the throughput of each mobile station is improved and inter-cell interference is also reduced.

Other objects, features and advantages of the invention will become apparent from the following description of the embodiments of the invention taken in conjunction with the accompanying drawings.

BRIEF DESCRIPTION OF THE DRAWINGS

FIG. 4 is a diagram illustrating an example (simulation result) of an SINR distribution for mobile stations inside a cell when carrying out FFR.

FIG. 11 is a diagram illustrating the judgment indicator and judgment reference of interference control in an embodiment of the present invention.

DETAILED DESCRIPTION OF THE EMBODIMENTS

Hereinafter, the present invention will be described by illustrating an embodiment thereof.

Figure 1:
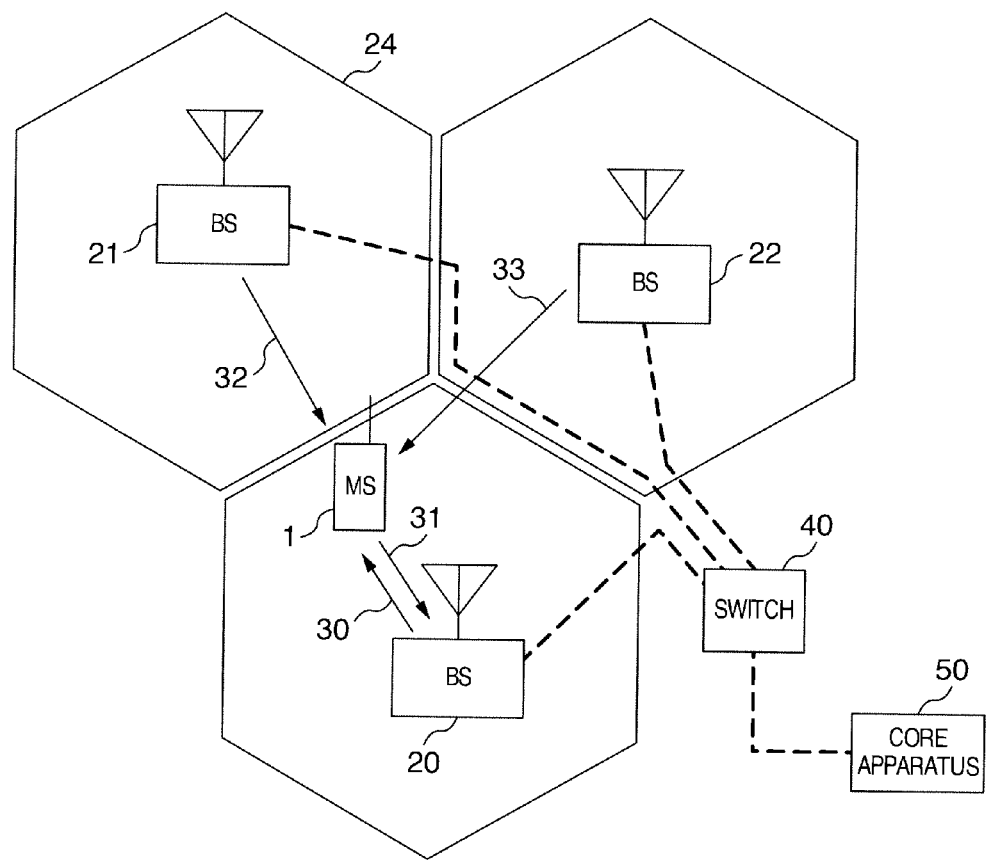
FIG. 1 is a diagram illustrating a configuration example of a mobile communication system to which the present invention is applied.

FIG. 1 shows a configuration example of a mobile communication system to which the present invention is applied. A mobile wireless communication system shown in FIG. 1 comprises a plurality of mobile stations, but only one of the plurality of mobile stations is shown and other mobile stations are omitted.

Base station apparatuses 20 to 22 carry out communication with a core apparatus 50, and are connected with a core network via the core apparatus 50. A signal from the core apparatus 50 is input into the base station apparatus 20 via a switch 40. The base station apparatus 20 converts the signal from the core apparatus 50 into a radio frequency signal and transmits it to a mobile station 1 by means of a wireless signal 30. The mobile station 1 receives the wireless signal 30 transmitted from the base station apparatus 20 and carries out communication with the core apparatus 50 by performing signal processing and converting the wireless signal into information.

On the other hand, the information generated by the mobile station 1 is converted into a radio frequency signal in the mobile station 1 and is transmitted to the base station apparatus 20 by means of the wireless signal 31. The wireless signal 31 transmitted from the mobile station 1 and received by the base station apparatus 20 is converted into information by signal processing inside the base station apparatus 20, and is transmitted to the core apparatus 50 via the switch 40. A plurality of base station apparatuses 20 to 22 are connected with the core apparatus 50 via the switch 40 and transmits and receives different signals, respectively.

Here, as shown in FIG. 1, it is assumed that the mobile station 1 exists in the vicinity of the boundary between the base station apparatus 20 and the base station apparatuses 21 and 22 adjacent to the base station apparatus 20. In such a situation, the wireless signal 30 transmitted from the base station apparatus 20 to the mobile station 1 interferes with the wireless signals 32 and 33 transmitted from the base station apparatuses 21 and 22. The mobile station 1 receives these interfering waves 32 and 33. The interfering waves 32 and 33 work as ones disturbing the desired wave 30 transmitted from the base station 20 to the mobile station 1. In other words, since a wireless signal necessary for the communication of a certain mobile station becomes a wave disturbing another mobile station, there is a need to reduce the influence thereof as much as possible.

One method for reducing this interference on the cell boundary is known as FFR (Fractional Frequency Reuse). This technology suppresses interference in a specified frequency band by weighting of the transmitted power from a plurality of adjacent base station apparatuses mutually sharing frequency resources to improve throughput.

Figure 2:
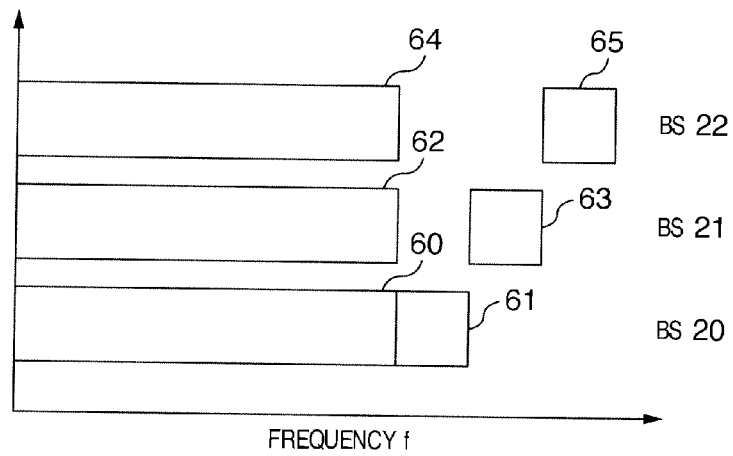
FIG. 2 is a diagram illustrating an example of allocation of wireless resources to a plurality of base station apparatuses when carrying out FFR.

FIG. 2 is a diagram illustrating an example of allocation of wireless resources to a plurality of base station apparatuses when carrying out FFR.

In FIG. 2, the horizontal axis shows the frequency f, and the bands lined up vertically indicate the frequency bands in which three adjacent base stations 20, 21, and 22 transmit signals, respectively. In FFR, by changing the frequency band in which each base station apparatus transmits as shown in FIG. 2, the interference to other base station apparatuses is reduced. Adjacent base station apparatuses 20, 21, and 22 carry out transmission in the specified frequency bands 60, 62, and 64. Since the adjacent base stations utilize exactly the same frequencies, the frequency repetition rate is one. This is called "using a reuse one (frequency repetition one)." Also, in the specified frequency bands 61, 63, and 65, adjacent base station apparatuses 20, 21, and 22 transmit at different frequencies, respectively. In this case, the adjacent base stations utilize completely different frequencies, and thus since base stations further adjacent to the adjacent base stations also use the same frequency reuse method, the frequency repetition rate is 3. This is called "use with a reuse 3 (frequency repetition 3)."

Next, an explanation will be given regarding the frequency allocation of a plurality of base station apparatuses in accordance with FFR.

Figure 3:
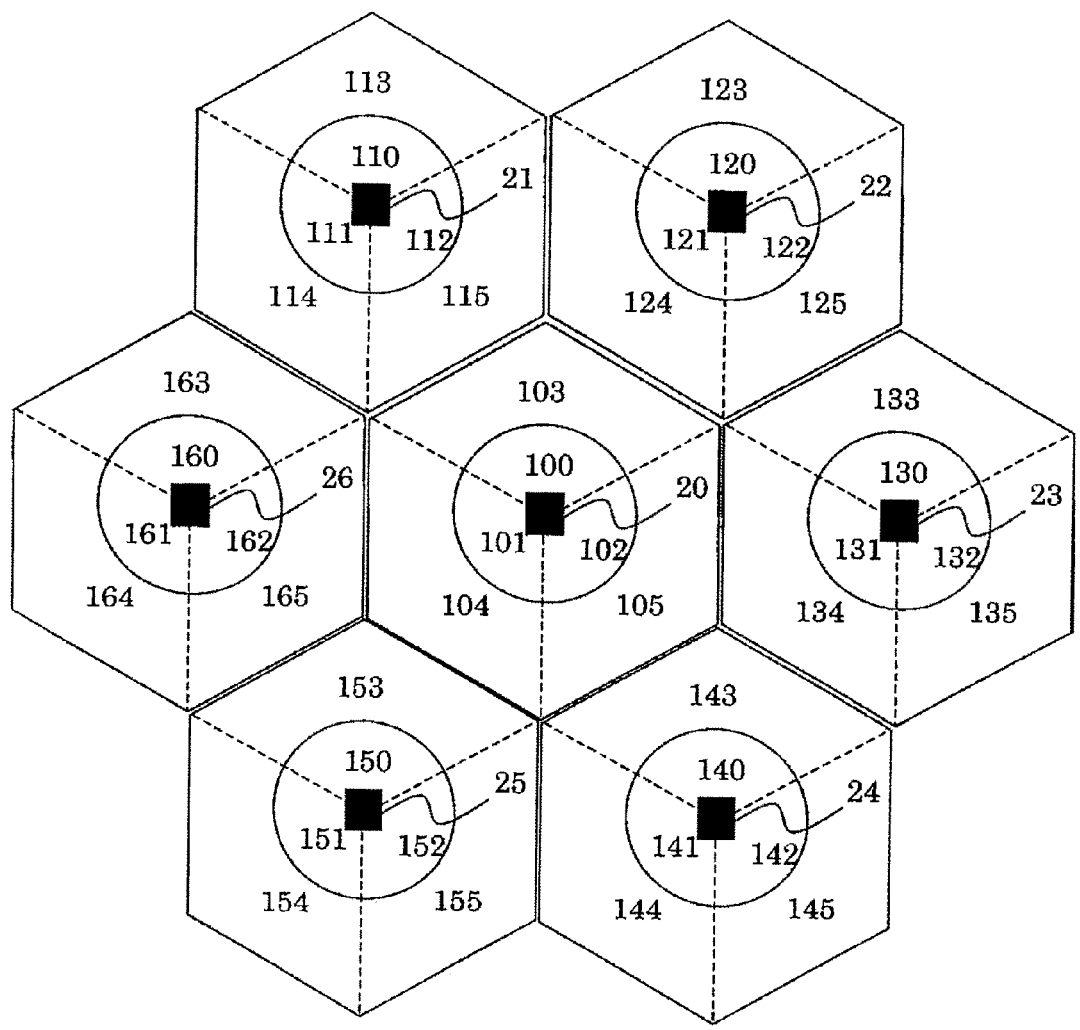
FIG. 3 is a diagram illustrating spatially the allocation of frequencies to a plurality of base station apparatuses when carrying out FFR.

FIG. 3 is a diagram illustrating spatially the allocation of frequencies to a plurality of base station apparatuses when carrying out FFR.

FIG. 3 shows the arrangement of seven base station apparatuses 20 to 26. Each base station apparatus has three sectors, the respective sectors covering fan-shaped areas expanding from the base station apparatus. The term "sector" is a name for a cell comprising the space divided into angularly using antenna directivity.

In terms of the base station apparatus 20 situated in the center, the respective sectors are subdivided into two types of area, central areas 100, 101, and 102 close to the base station apparatus 20, and boundary areas 103, 104, and 105 close to the cell boundaries. In the central areas, frequencies 60, 62, and 64 are used with the above reuse 1. Also, in the boundary areas, frequencies 61, 63, and 65 are allocated so as not to interfere with adjacent cells, and thus interference caused by the adjacent base station apparatuses is mitigated. This pattern is set in the same way even in other adjacent base stations, and thus the system as a whole is devised so that interference is reduced. Namely, three-digit number 1XN (X being a numeral from 0 to 6 and N being a numeral from 0 to 5) in FIG. 3 indicates that the boundary areas which has the same N equal to 3, 4, or 5 respectively use the same frequency so as to implement the reuse 3, and also that the central areas which has N equal to 0, 1, or 2 reuse frequencies of low transmitted power with the reuse 1. In this way, it is possible to apply FFR to a mobile wireless communication system of three-sector configuration.

FIG. 4 shows an example (simulation result) of the SINR (Signal-to-Interference and Noise power Ratio) distribution for mobile stations inside a cell when carrying out FFR.

The simulation result shown in FIG. 4 takes into consideration shadowing due to obstacles, the antenna patterns of the base station apparatuses, and propagation losses. The black squares written down as "3 Sector BS" in FIG. 4 indicate base station apparatuses. As shown on the lower right side of FIG. 4, the azimuth direction seen from the base station apparatus is expressed with counterclockwise angles, taking the upward direction on the page of FIG. 4 to be 0°. In this simulation result, three sectors have 0°, 120°, and 240° directions, respectively. The white circle locations indicate that the SINR is higher than 9 dB, and that the signal quality is excellent. Moreover, the black circle locations indicate that the SINR is lower than 0 dB, and that the signal quality is inferior. From this result, it is seen that there are black circles in the boundary areas with adjacent sectors, i.e. the signal quality is inferior.

Next, an explanation will be given regarding inter-sector interference using FIGS. 5A and 5B and FIGS. 6A and 6B.

Figure 5A:
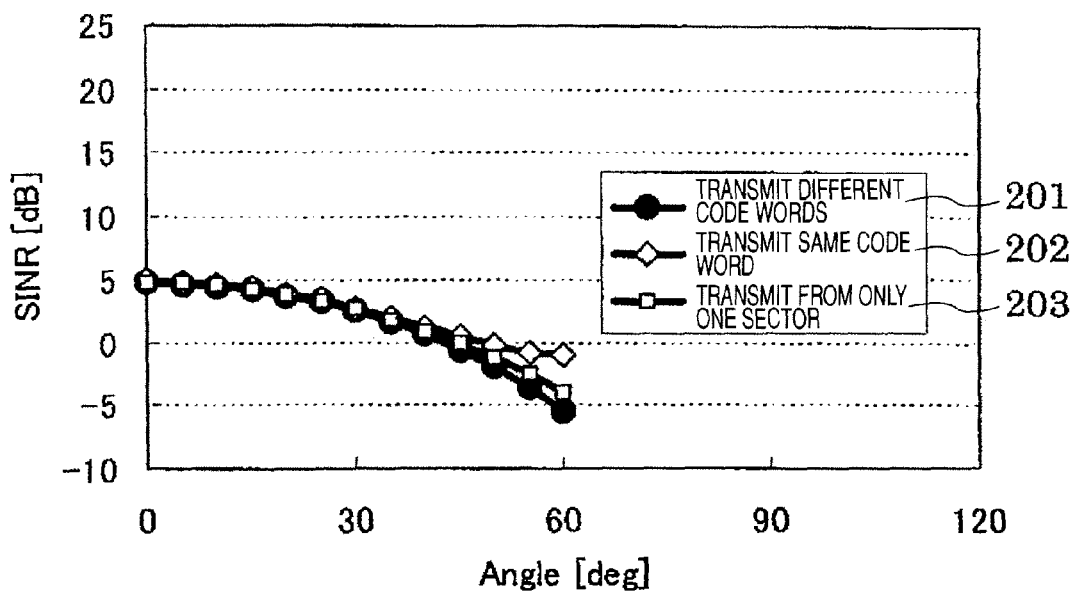
FIGS. 5A and 5B are diagrams illustrating changes of SINR dependent on the direction seen from a base station in the case where a mobile station is located on a sector boundary close to a cell boundary.
Figure 5B:
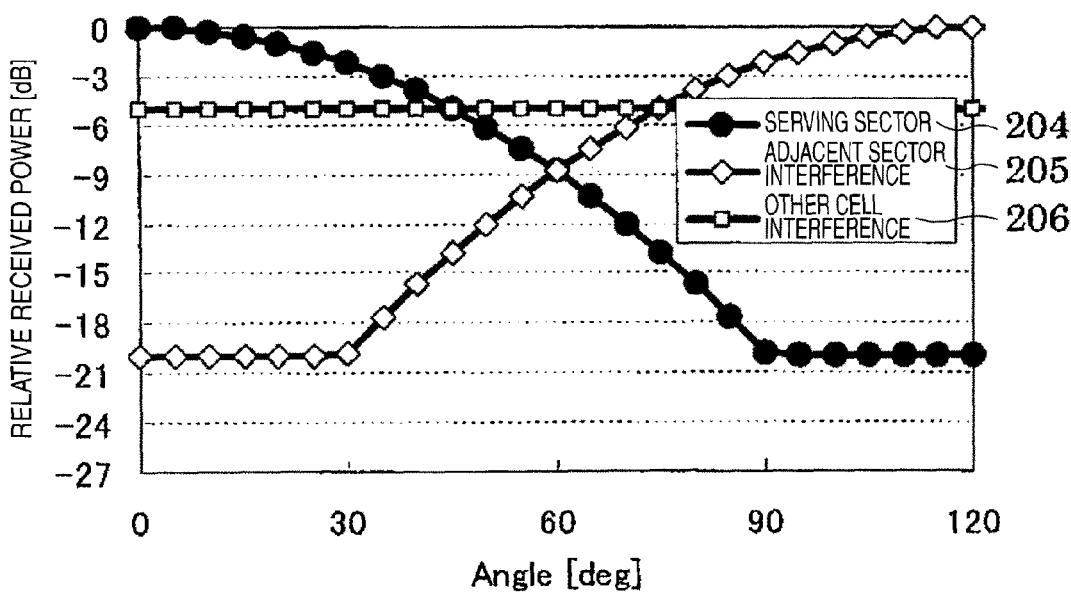

FIGS. 5A and 5B are diagrams illustrating location dependent change of SINR in the case where a mobile station is located on a sector boundary close to a cell boundary.

Figure 6A:
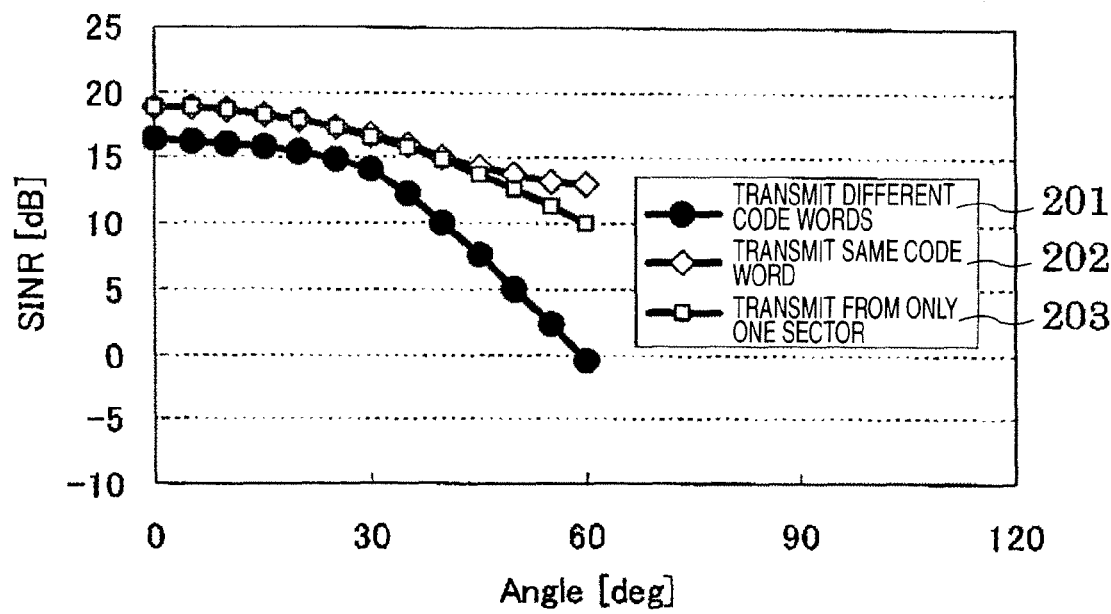
FIGS. 6A and 6B are diagrams illustrating changes of SINR dependent on the direction seen from a base station in the case where a mobile station is located on a sector boundary close to a cell center.
Figure 6B:
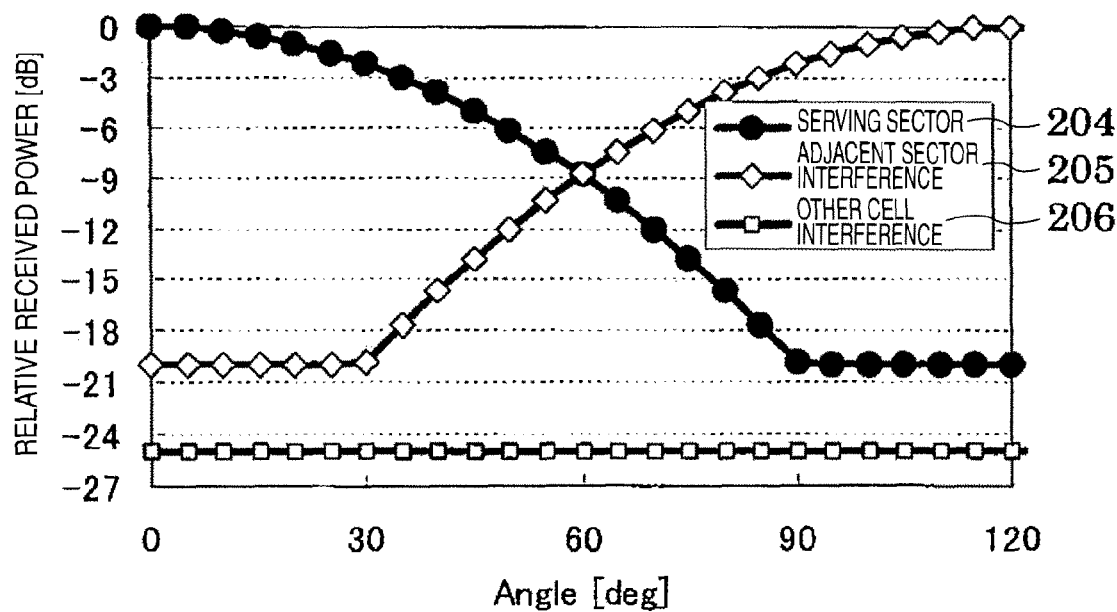

FIGS. 6A and 6B are diagrams illustrating location dependent change of SINR in the case where a mobile station is located on a sector boundary close to a cell center.

FIGS. 5A and 5B show results calculated assuming a case where a mobile station is close to the boundary of another base station's cell, and FIGS. 6A and 6B show results calculated assuming a case where a mobile station is close to the base station (cell center case). The respective diagrams take the antenna gain into consideration. The horizontal axis is the angle indicating the azimuth direction of the mobile station seen from the base station apparatus, in which 0° (left end) indicates that the concerned mobile station is located in the center of the sector, i.e. the direction in which the gain of an antenna facing a sector connecting the mobile station is maximal, 60° indicates the boundary with another adjacent sector (another sector of the same base station facing different azimuth direction) to the above sector, and then, 120° indicates the direction in which the antenna gain becomes maximal in the above another sector.

FIG. 5A and FIG. 6A are diagrams in which, in case where the base station can see a mobile station in the direction of an angle indicated on the horizontal axis, the SINR with which the mobile station is assumed to receive signals is indicated on the vertical axis. Also, in FIGS. 5B and 6B, in case where the base station can see a mobile station in an azimuth direction indicated on the horizontal axis, the signal power is indicated on the vertical axis, which the mobile station receives from a plurality of sector antennas of each base station.

See FIG. 5B and FIG. 6B. In FIG. 5B, signal power 204 indicated with black circles indicates the signal power from the serving sector of the concerned base station apparatus. Also, other cell interference 206 indicated with blank squares indicates the total of the interference from base station apparatuses other than the concerned base station apparatus. In practice, radio waves have an angular distribution depending on the position relationships of the base stations, but here, in order to make it easy understood, the model case of no angular distribution is explained.

In addition, lozenges indicate adjacent sector interference 205 which means the interference power from other sector adjacent to the serving sector in the concerned base station apparatus.

The signal transmitted from each sector is subject to the influence of the transmission side sector antenna gain. As a result, at an angle of 0° on the horizontal axis, the value of the received power of the serving sector 204 marked with black circles is a maximum value of 0 dB. As the angle shown on the horizontal axis increases, i.e. as the location of the mobile station deviates in direction from the center of the sector, the antenna gain of the serving sector decreases. At the very end, the gain decreases to −20 dB or less. (In practice, the domain in which the antenna gain is reduced (the domain in FIGS. 5B and 6B in which the gain is −20 dB) does not have a fixed gain, but here, in order to make it easy understood, the model case of a fixed value of −20 dB is explained.)

Next, see FIGS. 5A and 6A. The curve of black circles 201 indicates the SINR with which the concerned mobile station receives signals, in the case where the serving sector transmits a signal to the concerned mobile station and also an adjacent sector transmits a signal to another mobile station. Namely, the SINR with which the concerned mobile station receives signals in the serving sector is indicated, in the case where different code words bound for different mobile stations are transmitted from the adjacent sectors. Here, the term "code word" refers to a unit of encoded information.

First Method:

Transmitting different code words bound for different mobile stations from adjacent sectors is related art. In the SINR calculation, the signal power is the received signal power 204 from the serving sector, and the interference power is the sum of the received power 205 from adjacent sectors and the received power 206 from other cells. (This is referred to as the first method.)

Third Method:

The curve of lozenges 202 shows the SINR with which the concerned mobile station receives signals in the serving sector, in the case where adjacent sectors transmit collaboratively. The method for adjacent sectors transmitting collaboratively is devised as a method where a plurality of sectors cooperates. Two adjacent sectors transmit code words to the same mobile station. (This is referred to as the third method.) The third method uses either of two code transmission methods. The first one is a STBC (Space-Time Block Code) transmission method where two adjacent sectors transmit an identical code word simultaneously using the same frequency channel, and the second one is a SM (Spatial Multiplexing) transmission method where two adjacent sectors transmit different code words bound for one and the same mobile station. In such case where adjacent sectors transmit collaboratively, the sum of received power 204 from the serving sector and received power 205 from the adjacent sectors are considered as the signal power of the SINR, and received power 206 from other cells is considered as the interference power.

Second Method:

The curve of blank squares 203 shows the SINR with which the concerned mobile station receives signals in the serving sector, in the case of using a collaborative transmission method where only one among the adjacent sectors transmits signals collaboratively. Such collaborative transmission method is devised as a method where a plurality of sectors cooperate, different from that used by the third method. (This is referred to as the second method.) In the case of the collaborative transmission method where only one among the adjacent sectors transmits signals, two adjacent sectors use the concerned frequency channel, but only one sector transmits signals, and the other sector does not transmit signals. Since the adjacent sectors do not transmit in the same frequency channel at the same time, this method is a method where any inter-sector interference is not generated fundamentally, and interference to adjacent cells is also reduced. In the case of the collaborative transmission method where only one among the adjacent sectors transmits signals, received power 204 from the serving sector is considered as the signal power, and received power 206 from other cells is considered as the interference power. Since the other adjacent sector does not transmit any signals using the concerned resource (frequency channel), there is no received power 205 from the other adjacent sector. As a result, received power from the other adjacent sector is added to neither the signal power nor the interference power.

As mentioned above, FIG. 5A and FIG. 5B are diagrams illustrating the received power of a mobile station on a cell boundary where interference from other cells is great, and also that FIGS. 6A and 6B are diagrams illustrating the received power of a mobile station in a cell center.

In FIGS. 5A and 5B showing the received power on a cell boundary, the dominant interference item is other cell interference 206. FIG. 5A shows SINRs 201, 202, and 203 according to the above first to third methods. In the case of a cell boundary, even if the second method 203 where only one of the adjacent sectors transmits signals, and the other sector does not transmit signals is used, few effects can be obtained compared to the first method 201 of the related art. On the other hand, regarding the third method 202, in a narrow area of the sector boundary where the received power from the serving sector is almost the same as the received power from the adjacent sector, it is seen that the third method can be used since gains with respect to signals from both sectors can be combined. Although the third method consumes resources since a code word is simultaneously transmitted from the adjacent sectors, it can improve the SINR on the sector boundary which had decreased to about −5 dB, to the vicinity of 0 dB.

On the other hand, in FIGS. 6A and 6B showing the received power at the cell center, the SINR improvement due to third method 202 and second method 203 is great compared to the first method 201 of the related art, since most of the interference was that from adjacent sectors. In particular, remarkable effects start to appear from around 30° where interference between adjacent sectors starts to appear.

It can be said that it is easy compared to collaborative transmission with other cells, to carry out this kind of collaborative transmission between sectors, since they are co-located inside the same base station apparatus. However, as seen from FIGS. 5A and 5B and FIGS. 6A and 6B, the method that should be adopted depends on whether the mobile station is on the cell boundary or at the cell center, and also on the direction with respect of the beam center of the sector in which the mobile station is located. Hereinafter, the present specification will disclose a method where it is judged accurately which method to change the current method to.

An outline of the present invention is as follows:

a wireless system comprises a plurality of base station apparatuses which have sectors having different areas covered by a plurality of different directional antennas arranged in the same place, and mobile stations connected with at least one sector (serving sector) of the above base station apparatus, wherein the base station apparatuses designate with respect to the mobile station, the conditions which invoke a measurement result report, the mobile stations receive a reference signal transmitted from sectors of a plurality of base stations including other base stations, measures the reference signal received power (RSRP) thereof, and reports the measurement results to the base station regarding those sectors which meet the above condition, and the condition is the case in which the RSRP power ratios of adjacent sectors to the serving sector become equal to or greater than predetermined threshold values which are at least two kinds of threshold values, a first threshold value pertaining to the RSRP of the adjacent sectors to the serving sector and a second threshold value pertaining to the RSRP of the sectors of other base stations, and are set so that the RSRP report pertaining to the above adjacent sectors is easier to be invoke than the one pertaining to the sectors of other base stations.

Further, the base station apparatus has a single sector mode of no collaboration between sectors; a sector selection mode of collaborating between sectors to transmit with a specified frequency resource from only one sector, and a collaboration mode of collaborating between sectors to transmit signals from both sectors; and selects any of the three modes on the basis of the above measurement results of the RSRP.

In addition, a mobile station instructed by the base station apparatus to implement two modes of coordinating between sectors transmits to the base station apparatus, Channel Quality Information (CQI) pertaining to a plurality of sectors.

In addition to the CQI information pertaining to the plurality of sectors, the above mobile station instructed by the base station apparatus to implement two modes of coordinating between sectors transmits to the base station, rank information (RI) about propagation paths pertaining to the plurality of sectors.

In addition to the CQI and RI information pertaining to the plurality of sectors, the above mobile station instructed by the base station apparatus to implement two modes of coordinating between sectors transmits to the base station, precoder information (PMI) pertaining to the plurality of sectors.

Moreover, in the collaboration mode, there are a closed loop mode of transmitting PMI and an open loop mode of not transmitting PMI, which are switched depending on the moving velocity estimated by the base station.

The specific embodiment of the present invention will be explained using FIGS. 7, 8, 9, 10, and 11.

Figure 7:
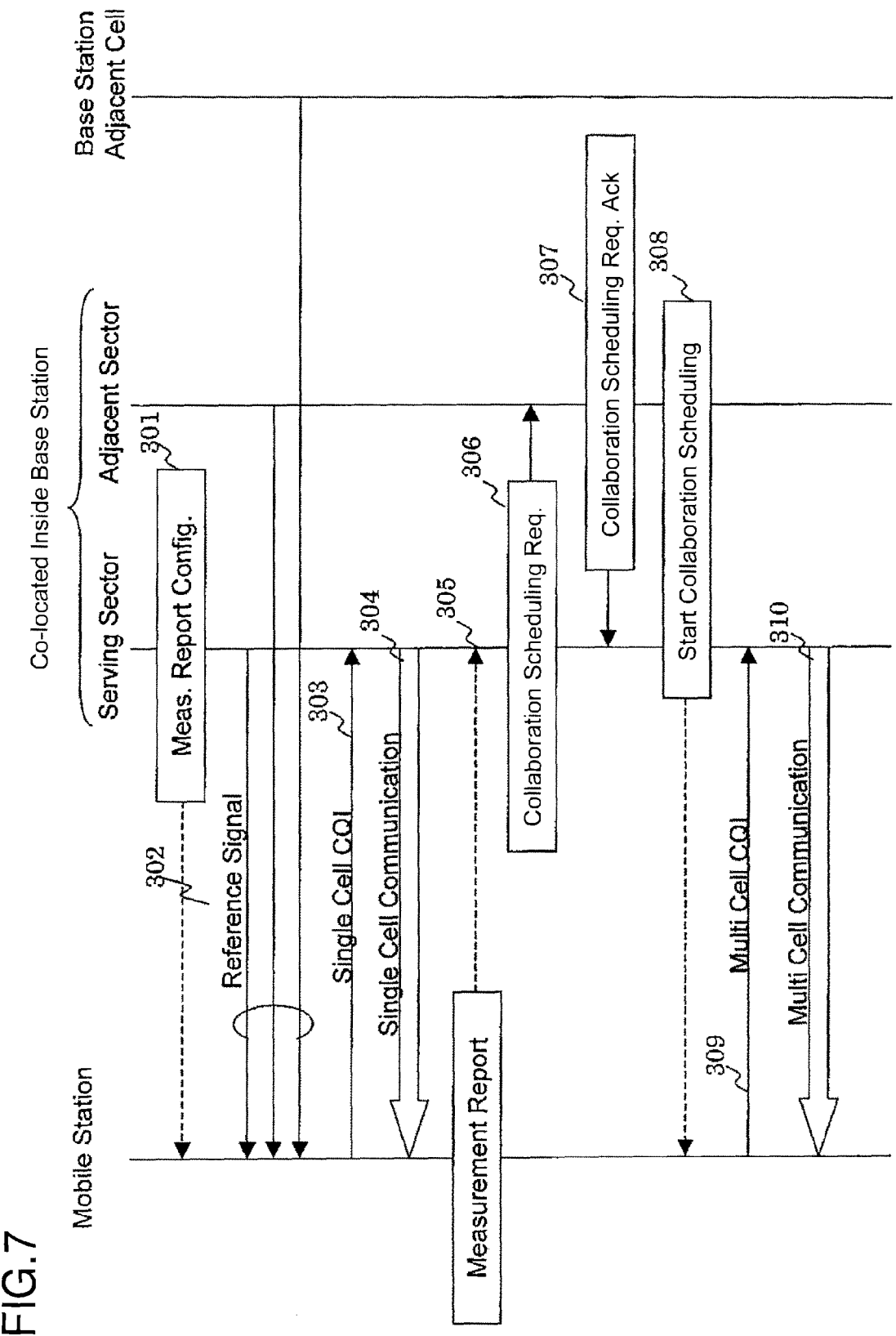
FIG. 7 is a sequence diagram illustrating an interference control procedure in an embodiment of the present invention.

FIG. 7 is a sequence diagram illustrating an interference control procedure in an embodiment of the present invention.

Figure 8:
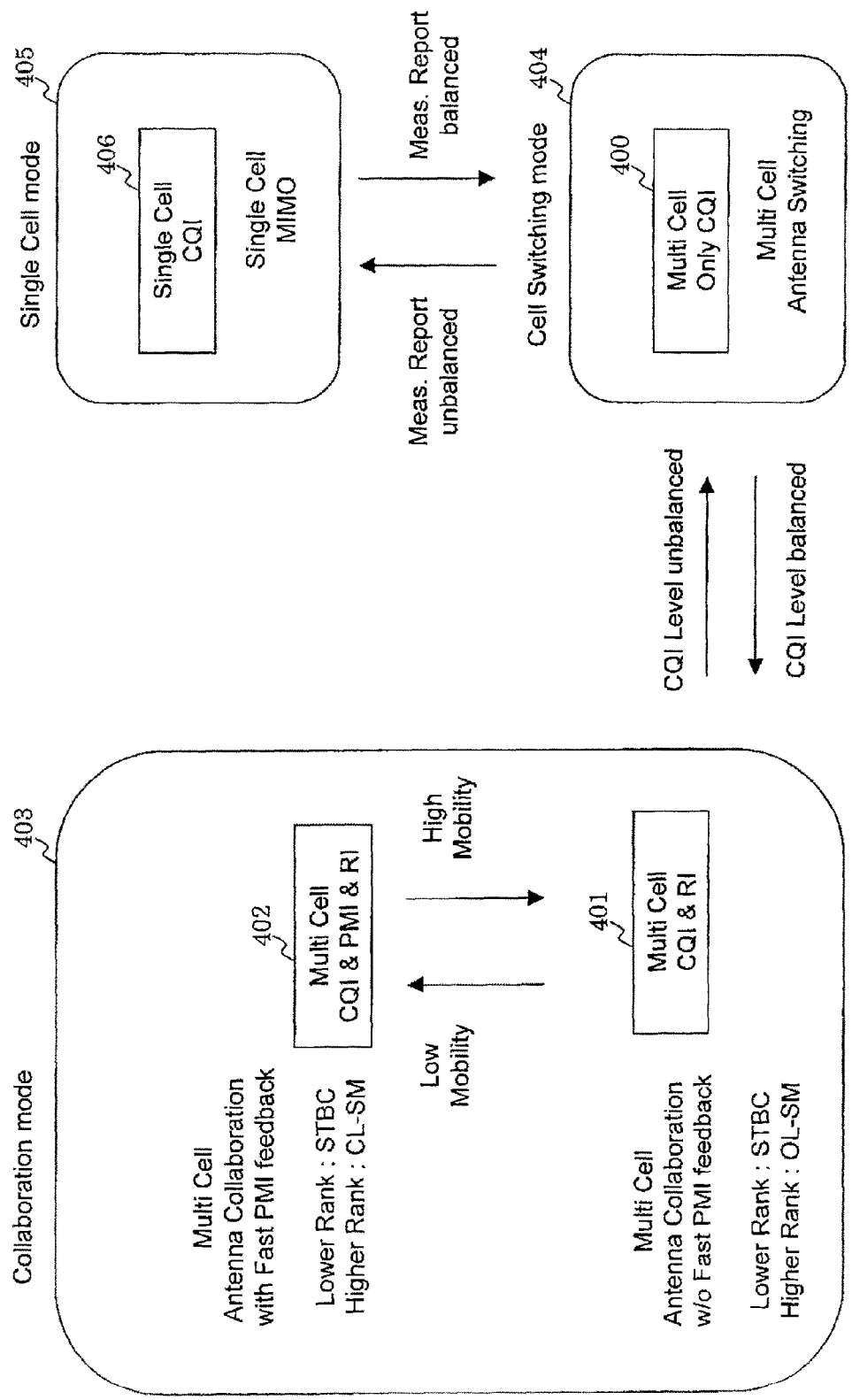
FIG. 8 is a state transition diagram of interference control in an embodiment of the present invention.

FIG. 8 is a state transition diagram of interference control in an embodiment of the present invention.

Figure 9:
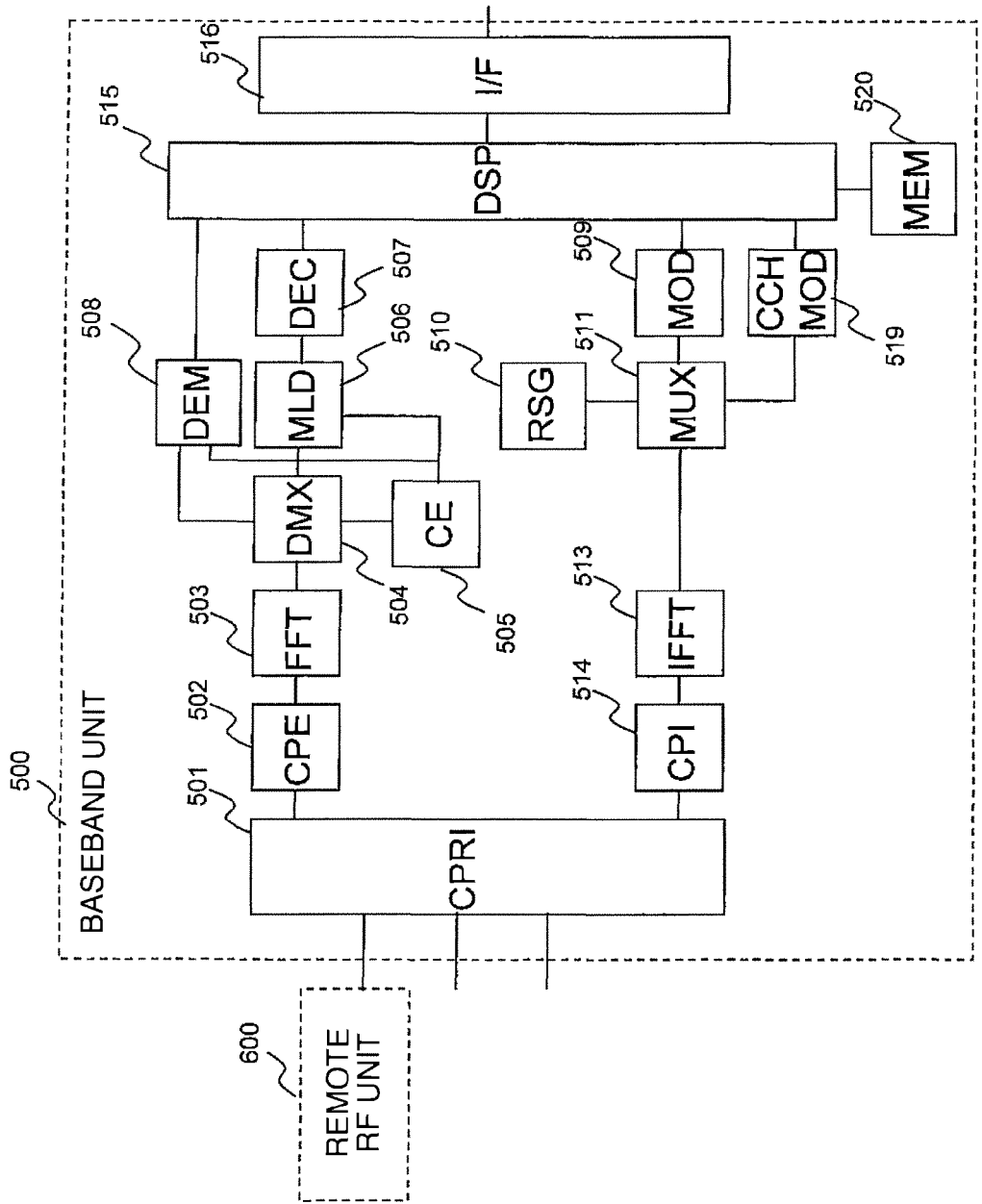
FIG. 9 is a diagram illustrating the configuration of a baseband unit of a base station apparatus in an embodiment of the present invention.

FIG. 9 is a diagram illustrating the configuration of a baseband unit of a base station apparatus in an embodiment of the present invention.

Figure 10:
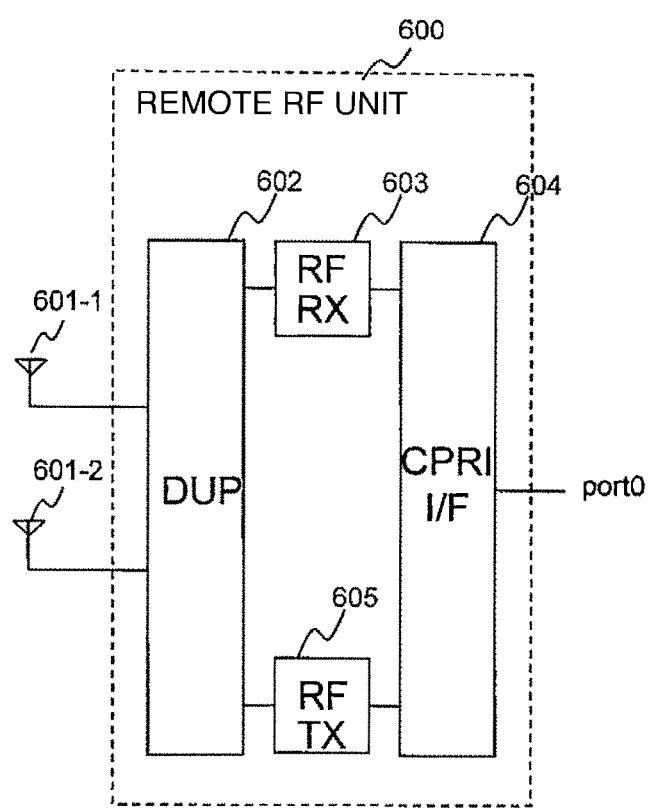
FIG. 10 is a diagram illustrating the configuration of a remote RF unit of a base station apparatus in an embodiment of the present invention.

FIG. 10 is a diagram illustrating the configuration of a remote RF unit of a base station apparatus in an embodiment of the present invention.

FIG. 11 is a diagram illustrating the judgment indicator and judgment reference of interference control in an embodiment of the present invention.

Using FIGS. 9 and 10, an explanation will be given regarding the configuration of a base station apparatus transmitting collaboratively. First, an explanation will be given regarding the receiving system. The signal received by an antenna 601 in FIG. 10 is processed in a receiving RF unit 603 via a duplexer 602, and is converted into a baseband signal. The converted received baseband signal is converted into a signal format convenient for optical fiber communication in a CPRI (Common Public Radio Interface) I/F unit 604, and is sent to a baseband unit 500 from a port 0. In the baseband unit 500, the received signal is input from the left-hand side of FIG. 9, is reconverted in the CPRI I/F unit 501 from an optical signal to an electrical signal in a convenient format, and is stored temporarily in a memory inside the CPRI I/F unit 501. Here, the CPRI IN can connect with a plurality of remote RF (Radio frequency) units 600. As one example, functional decomposition can be considered in which one remote RF unit is in charge of one sector. In such a case, the processing of different sectors can be carried out with the same hardware, since the memory of the CPRI is prepared for several sectors, and in next signal processing, information is extracted from the memory by time-sharing technique, Hereinafter, processing of a plurality of sectors is assumed, but the processing of one sector will be explained as an example.

Next, in a CPE (Cyclic Prefix Extraction) unit 502, estimating the timing of CP (Cyclic Prefix) based on the received signal read from the memory of the CPRI I/F unit 501, and processing to remove the CP is carried out. Then, in a FFT (Fast Fourier Transform) unit 503, the received signal is converted by FFT processing from the time domain to the frequency domain. The converted information is subdivided into some functional elements by a demultiplexer unit 504.

The first functional element is a reference signal for estimating the propagation path. The reference signal is sent to a channel estimation unit 505, and propagation path estimation is carried out. The second functional element is a control channel. The control channel is sent to a demodulation unit 508 to be detected and decoded using the propagation path estimation result output by the channel estimation unit 505, and significant control information which is the obtained result is sent to a DSP (Digital Signal Processor) 515. DSP 515 is implemented using the CPU (Central Processing Unit) or the DSP chip, but hereinafter the explanation will be given calling it DSP as a generic name. Control information includes measurement results such as the received power of the adjacent sectors and adjacent cells measured by the mobile station, and fast feedback information such as CQI (Channel Quality Indicator), RI (Rank Indicator), and PMI (Precoding Matrix Indicator) information.

Further, the third functional element is user data, which is sent to an MLD (Maximum Likelihood Decision) unit 506. The MLD unit 506 carries out a maximum likelihood decision based on the channel estimation result, and obtains an LLR (Log Likelihood Ratio). On the basis of the obtained LLR, a decoder unit 507 carries out turbo decoding and extracts significant information. The extracted information is sent to DSP 515. DSP 515 carries out L2 or L3 processing, and then transmits the information via a line interface 516 to a network device not shown in the figure.

Next, an explanation will be given regarding downlink processing. Information transmitted from the network is introduced into a memory 520 of DSP 515 via the line interface unit 516. DSP 515 carries out Layer 2 (herein after referred to as "L2") or Layer 3 (herein after referred to as "L3") processing. Also, a scheduler built into DSP 515 compares the wireless conditions for information of a plurality of users, selects a user with excellent wireless conditions, and decides the allocation of a specific frequency resource. DSP 515 carries out processing of a plurality of sectors by time-sharing technique, and the configuration information and user data of the respective mobile stations under control are stored in a common memory 520.

The data processed with L2 and L3 processing on the basis of the decision result of the scheduler built into DSP 515 is sent to a modulation unit 509. The modulation unit 509 conducts channel coding processing such as turbo coding and interleaving, and modulation processing for converting to 16QAM (Quadrature Amplitude Modulation) or the like. The modulation result is input into a multiplexer unit 511, and channel assignment is carried out on the basis of the scheduling result for each function. The term "channel assignment" refers to processing that maps the transmitted code to the information in the three dimensions of frequency, OFDM symbols, and transmission antennas. Further, the multiplexer unit 511 can multiply the transmitted signal by a precoding matrix for each antenna to carry out spatial direction beam forming. The multiplexer unit 511 assigns appropriate frequencies, times, and antennas to not only user information but also reference signals generated by a reference signal generating unit 510 and control channel information obtained as a result that a control information coding unit 519 encodes and modulates L2 and L3 control information created by DSP 515. The output of the multiplexer unit is processed with IFFT (Inverse Fast Fourier Transform) processing by an IFFT unit 513 for each antenna, is added a CP (Cyclic Prefix) to by a CPI (Cyclic Prefix Insertion) unit 514, and is sent to the CPRI I/F unit 501. The CPRI OF unit 501 converts it into a signal format convenient for optical transmission and is sent to the remote RF unit 600. In the remote RF unit 600 shown in FIG. 10, the information received from port 0 is converted into a signal format convenient for a transmitted signal by a CPRI I/F unit 604, is converted from a baseband signal into a wireless signal and amplified by a transmitting RF unit 605, is sent to an antenna 601 via the duplexer 602, and is transmitted from the antennas.

The present embodiment is configured so that it is easy to carry out collaborative transmission, since DSP 515 stores transmission information pertaining to a plurality of sectors and mobile station information in the common memory 520. DSP 515 can decide by itself whether to perform collaborative transmission or not, since the control information transmitted from the mobile station arrives at DSP 515.

Here, the points are that the contents reported from the mobile station are carefully selected to reduce overhead due to uplink control information, and that there is a mechanism to appropriately judge whether cooperation between sectors is possible or not. Therefore, in the present embodiment, state transitions in the mobile station (405↔404↔403 or 405 ↔ 403) shown in FIG. 8 is implemented by L2 or L3 control.

First, an explanation will be given regarding the three modes.

The first mode 405 corresponds to the above first method, and is the related art mode where sectors do not cooperate. As fast feedback, the mobile station reports the CQI (Channel Quality Indicator) of a single sector. Also, this mode includes the case where, when the base station has a plurality of antennas for one and the same sector and MIMO transmission is possible, it carries out fast feedback of rank information (RI) and precoding matrix (PMI) pertaining to only antennas of the single sector. Here, the rank information (RI) will be explained. In MIMO communication, a plurality of transmitting antennas and a plurality of receiving antennas are used. A matrix expressing the characteristics of propagation paths from the plurality of transmitting antennas to the plurality of receiving antennas is called a "channel matrix." The rank information (RI) is information representing degenerate states of the channel matrix. The precoding matrix (PMI) is an indicator number representing array weights by which a signal is multiplied when transmitting the signal from the antenna. A few kinds of array weights are predetermined by a system. A mobile station selects array weights appropriate to the reception condition, and transmits the selected array weights as an indicator number PMI to a base station to instruct the array weights by which the signal is multiplied.

The second mode 404 corresponds to the above second method where sectors cooperate, but only high-speed sector switching is carried out. As fast feedback, the mobile station transmits CQI information pertaining to a plurality of sectors to the serving sector. On the basis of the feedback information, the base station transmits a signal to the concerned mobile station from only any one of the plurality of adjacent sectors. On that occasion, the same frequency channel as that used for the concerned mobile station is not transmitted from any cooperating sector other than the concerned sector. Since the base station side receives the CQI information, it receives the signals transmitted by the mobile station using not only the antenna of the serving sector but also a plurality of sector antennas, and receives signals from the plurality of sectors to synthesize the received signal therefrom. On the basis of the received CQI information, the base station selects a sector from which to transmit.

The third mode 403 corresponds to the above third method where sectors cooperate and a signal is sent simultaneously to one and the same mobile station from different sectors. As fast feedback, the mobile station transmits CQI and RI information pertaining to a plurality of sectors to the serving sector, and also transmits PMI information pertaining thereto according to circumstances. The base station transmits a signal simultaneously to one and the same mobile station from a plurality of adjacent sectors on the basis of the feedback information. Since the base station side receives these pieces of information, and it receives the signal transmitted by the mobile station with not only the antenna of the serving sector but also a plurality of sector antennas, synthesizes them, and decodes the synthesized signal. The base station changes the transmitting method (STBC, CL-SM, or OL-SM) on the basis of the received CQI, RI, and PMI information.

STBC (Space Time Block Code) is a transmitting method where diversity effects are increased by generating redundancy by coding single original information and distributing the redundancy to the antennas with different directions and over time.

CL-SM (Closed Loop Spatial Multiplex) is a SM scheme where appropriate precoder information is fed back using fast feedback. CL-SM is used in the case where the mobility of a mobile station is so low that the precoder information can be fed back in time. Further, since CL-SM is a SM scheme, a plurality of antennas transmit different original information respectively unlike STBC.

OL-SM (Open Loop Spatial Multiplex) is a SM scheme where appropriate precoder information is not fed back using fast feedback. OL-SM is used in the case where there is no time for feedback of precoder information due to high mobility of the mobile station.

The judgment indicator and judgment reference for interference control are explained using FIG. 11.

FIG. 11 shows the relationship between each mode and the reference signal received power (RSRP). In FIG. 11, the vertical axis indicates the ratio of the adjacent sector RSRP to the serving sector RSRP. The horizontal axis indicates the ratio of the RSRP of the adjacent cell's sector from which the highest power is received to the serving sector RSRP.

A mobile station in the first mode 405 based on single-sector processing transits to the sector switching mode 404, e.g. in the case where the ratio of the adjacent sector RSRP to the serving sector RSRP is equal to or greater than −20 dB. However, in the case where the location of the mobile station is close to the cell boundary and the interference power from adjacent base stations becomes greater than −10 dB, the first mode 405 is maintained, since there is almost no effect of the sector switching mode as shown in FIGS. 5A and 5B. FIG. 11 shows that the sector switching mode 404 is not operated in the area to the right of e.g. −10 dB on the horizontal axis. In this case, the first mode 405 based on single sector processing is selected and the sectors do not cooperate.

Also, if the ratio of the adjacent sector RSRP to the serving sector RSRP becomes still greater to move up further in the upward direction on the page as shown in FIG. 11 and the ratio becomes −3 dB or greater, the sector switching mode 404 of a mobile station transits to collaboration mode 403. In this case, as seen from FIGS. 5A and 5B, since an SINR improvement effect can be expected due to collaborative transmission even on the sector boundary, collaboration mode 403 is selected regardless of the interference power from the adjacent base stations.

In the case where the received power from a specific sector of adjacent base stations becomes stronger than that of the serving sector, or where the received power from a sector adjacent to the serving sector becomes stronger than that of the serving sector, a handover is conducted with respect to the concerned sector. FIG. 11 shows that handover operation is started in the case where the RSRP of the target sector becomes stronger than that of the serving sector by a hysteresis value of $\Delta$ dB.

It is necessary for the serving sector to carry out the judgment in FIG. 11. Because of that, it is necessary to make the mobile station report appropriate RSRP information. Regarding the adjacent sectors to the serving sector, in the case where the adjacent sector RSRP can be observed to be even slightly greater than −20 dB, the mobile station is set to report it to the base station. Also, regarding the RSRPs of an adjacent base station's sectors, it is not necessary to make the mobile station report it until a relatively large power of about −10 dB is observed. Since the uplink overhead becomes large if the RSRPs regarding a number of sectors is reported periodically, it is better to minimize the number of reported RSRPs. Consequently, threshold values for the sector RSRP report request are set differently in the concerned base station and the adjacent base stations.

Transitions between modes in FIG. 8 will be reviewed.

The transition from the first mode (405) to the second mode (404) occurs when the ratio of the adjacent sector RSRP to the serving sector RSRP is greater than a threshold (for example, −20 dB). RSRP is reported via measurement report from a mobile station to a base station if predetermined some conditions are met. In the case where a report called "Measurement Report Balanced" is transmitted from the mobile station when the condition among the predetermined conditions is met that the measurement result of the concerned adjacent sector RSRP is close to that of the serving sector RSRP, the transition from the first mode (405) to the second mode (404) occurs. On the contrary, in the case where a report called "Measurement Report Unbalanced" is transmitted when the ratio of the concerned adjacent sector RSRP to the serving sector RSRP is smaller than a threshold (for example, −20 dB), the transition from the second mode (404) to the first mode (405) occurs. In the second mode (404), the base station receives a CQI report regarding a plurality of sectors from the mobile station. In the case where CQI values of the plurality of sectors are close, namely in the case of the range from $\Delta$ dB to −3 dB on the vertical axis in FIG. 11, a transition to the third mode (403) occurs as levels of CQI are balanced. On the contrary, in the case where CQI values become different in the third mode (403), a transition to the second mode (404) occurs as levels of CQI are unbalanced.

FIG. 7 shows a sequence diagram illustrating an interference control procedure in an embodiment of the present invention.

FIG. 7 shows a flowchart necessary for the transition from the single sector processing to the multi-sector processing.

First, a measurement report configuration is transmitted from the serving sector to the mobile station (Step 301). The contents set with this step are, for example the number of base stations subject to the report, measurement report transmission conditions, measurement intervals, and the like. This configuration differs greatly from the related art as follows: the contents of the measurement report configuration regarding the serving sector and other co-located sectors are different from those of other base stations which are not co-located. The serving sector and other co-located sectors trigger to transmit an RSRP report greatly differently from other base stations which are not co-located. Transmitting the report is triggered by an event. For example, the event occurs in the state where, compared to the serving sector RSRP, the RSRP of other sectors or base stations is equal to or less than the threshold value. Specifically, it occurs in the case where Ms+Os<Mn+On is true. Here, Ms is the RSRP measurement result of the serving sector, Os is the offset of the serving sector, Mn is the RSRP measurement result of the neighboring sector or a specific sector of other base stations, and On is the offset of the neighboring sector or the specific sector of other base stations.

A feature of the present invention is that the value of On differs greatly in the neighboring sector and the specific sector of other base stations. In the case of the neighboring sector, as obvious from FIGS. 6A and 6B, the effect of collaborative transmission appears when the RSRP ratio is at least −20 dB equivalent to the FB (Front Back) ratio. Because of this, a great offset value On>Os+20 is set so that a little interference from neighboring sectors can be recognized.

On the other hand, in the case of the specific sector of other base stations, it may be determined that the RSRP ratio is about −10 dB since it is sufficient only to decide whether it is the cell boundary or the cell center. Consequently, a small offset value On>Os+10 is set.

Accordingly, in Step 301, the power ratio of another sector RSRP to the serving sector RSRP is set in the mobile station with the following relationship:

(the power ratio of the specific sector of other base stations)<(the power ratio of another sector of the concerned base station).

In the example of FIG. 7, after transmitting the measurement report configuration from the serving sector to the mobile station (Step 301), the mobile station receives a reference signal 302 from the serving sector, other sectors co-located with the serving sector, and other base stations which are not co-located, and transmits the single cell CQI 303 (or CQI together with the RI and PMI) of a single sector to the serving sector. The reference signal is also used as fast feedback, and the base station decides scheduling and MCS (Modulation and Coding Scheme) on the basis of the fast feedback to transmit a downlink packet via single cell communication (Step 304).

The mobile station is continuously carrying out measurements in accordance with the measurement report configuration set in Step 301. In the case where meeting the condition regarding the neighboring sector RSRP as described above, Ms+Os<Mn+On, a measurement result is reported to the serving sector (Step 305). The serving cell checks whether it is reported or not that the highest RSRP is regarding the sector in another base station, and if it is not reported, the mobile station judges that it is in the cell center, and decides to transmit collaboratively. If it is reported, the ratio of the concerned sector RSRP to the serving sector RSRP is compared with the predetermined threshold value (−10 dB in FIG. 11), and if the ratio is smaller than the threshold value, it is judged that the mobile station is in the cell center and decides to transmit collaboratively. If the ratio is greater than the threshold value, it is further determined whether the ratio of the neighboring sector RSRP to the serving sector RSRP is smaller than a threshold value Th1. In the case where it is smaller, collaborative transmission is decided. In other cases, single-sector transmission is decided.

In the case where collaborative transmission is decided, it is inquired via a collaboration scheduling request whether the neighboring sector can collaborate or not (Step 306). If the neighboring cell has no rejection due to a special reason such as a lack of resources, and returns collaboration scheduling request ACK (Step 307), the start of collaborative transmission is notified via a collaboration scheduling to the mobile station (Step 308). In collaborative transmission, since multi cell CQI reports from the mobile station become necessary concerning several sectors, the mobile station periodically reports the same information (Step 309). Based on the report results, multiple sectors transmit collaboratively (Step 310).

In collaborative transmission, two kinds of information are transmitted from the mobile station.

One is the RSRP report with which the interference power from other base stations can also be grasped. The other one is fast feedback information. On the basis of these, the serving sector selects the collaborative transmission mode. The collaborative transmission mode is classified into two modes 403 and 404 (see FIG. 8) as explained above.

One is an antenna switching mode 404 (see the state transition diagram of FIG. 8) where only one sector sends information. In this mode, the mobile station reports CQI concerning a plurality of sectors (Step 400), and transmits a signal from the sector where the strength of CQI is higher.

The other one is an antenna collaboration mode 403 (see the state transition diagram of FIG. 8) where both sectors send information. This mode 403 is further classified into two sub-modes 401 and 402 based on mobile station mobility and the SINR with which the mobile station receives signals.

Submode 401 is an open loop processing mode where the mobile station does not transmit a PMI as fast feedback, and channels are pseudo-randomized on the frequency axis by CDD (Cyclic Delay Diversity) and transmitted. CDD is implemented by inserting a frequency-dependent rotational component into a precoding matrix by which the signal is multiplied for each antenna in the multiplexer unit 511 in FIG. 9. Open loop processing is adopted in the case where there is no time for feedback of precoding matrix from the mobile station due to high mobility of the mobile station or the like. As a result, the uplink channel estimation unit 505 in the base station monitors the moving velocity of the mobile station, and if the moving velocity exceeds a threshold value, the uplink channel estimation unit 505 selects the open loop processing of the submode 401.

Submode 402 is a closed loop processing mode where the mobile station transmits a PMI as fast feedback, and a precoder of each sector antenna are set using the PMI. The precoding are implemented as a result that the transmitted signal is multiplied by the specified precoding matrix in the precoder of the multiplexer unit 511 in FIG. 9 and is transmitted. If the moving velocity of the mobile station is equal to or lower than the threshold value because of low mobility of the mobile station or the like, the uplink channel estimation unit 505 selects the closed loop processing of the submode 402.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless communication system having a plurality of mobile stations and a plurality of base station apparatuses communicating with said plurality of mobile stations wirelessly, wherein
said plurality of base station apparatuses each have a plurality of antennas, a received signal processing unit, a transmitted signal processing unit, a memory, and a control unit, respectively;
the coverage area of one of the base station apparatuses is subdivided angularly into a plurality of sectors by means of said plurality of antennas, and said control unit is configured to control the communication for each sector with the mobile stations connected with the concerned sector;
said one base station apparatus is configured to transmit in advance a measurement report configuration from a first sector to a mobile station connected with said first sector, the measurement report containing information pertaining to reception condition from sectors and base station apparatuses that said mobile station receives;
said mobile station, in accordance with the measurement report configuration received from said first sector whose contents are set in advance in said mobile station, is configured to measure the information pertaining to reception condition from sectors and base station apparatuses that said mobile station receives, and to transmit said measurement report to said first sector; and
said one base station apparatus, when receiving the measurement report from said mobile station connected with said first sector, is configured to select, on the basis of contents of said measurement report, any of a plurality of transmission methods for controlling interference from sectors and base station apparatuses other than said first sector to said mobile station, and to transmit a signal with the selected transmission method to said mobile station;
wherein
the measurement report from said mobile station includes: received power of reference signals transmitted from sectors and base station apparatuses that said mobile station receives; and channel quality information pertaining to sectors and base station apparatuses that said mobile station receives,
and wherein,
on the basis of received power of the reference signals transmitted from sectors and base station apparatuses which the mobile station receives and channel quality information pertaining to sectors and base station apparatuses which said mobile station receives,
in the case where the received power of the signal transmitted from said first sector is equivalent to that of the signal transmitted from a sector or base station apparatus adjacent to said first sector, but there are differences in the channel quality information, the base station apparatus is configured to use a transmission method for transmitting a signal to said mobile station from one of said first sector and the sector or base station apparatus adjacent to said first sector and not transmitting from the other sector or base station apparatus adjacent to said first sector; or,
in the case where the received power and the channel quality information of the signal transmitted from said first sector are equivalent to those of the signal transmitted from a sector or base station apparatus adjacent to said first sector, respectively, the base station apparatus is configured to use a transmission method for transmitting a signal to said mobile station from both of said first sector and the sector or base station apparatus adjacent to said first sector.

2. The wireless communication system according to claim 1, wherein contents of said measurement report configuration which are set in advance in said mobile station include number of sectors or base station apparatuses subject to measurement, measurement contents, and measurement intervals.

3. A wireless communication method associated with a wireless communication system having a plurality of mobile stations and a plurality of base station apparatuses communicating with said plurality of mobile stations wirelessly by means of a plurality of antennas, wherein
said plurality of base station apparatuses configure a plurality of sectors into which the coverage area of one of the base station apparatuses is subdivided angularly by means of said plurality of antennas, and control the communication for each sector with the mobile stations connected with the concerned sector;
said one base station apparatus is configured to transmit in advance a measurement report configuration from a first sector to a mobile station connected with said first sector, the measurement report containing information pertaining to reception condition from sectors and base station apparatuses that said mobile station receives;
said mobile station, in accordance with the measurement report configuration received from said first sector whose contents arc set in advance in said mobile station, is configured to measure the information pertaining to reception condition from sectors and base station apparatuses that said mobile station receives; and to transmit said measurement report to said first sector; and
said one base station apparatus, when receiving the measurement report from said mobile station connected with said first sector, is configured to select, on the basis of contents of said measurement report, any of a plurality of transmission methods for controlling interference from sectors and base station apparatuses other than said first sector to said mobile station, and to transmit a signal with the selected transmission method to said mobile station;
wherein the measurement report from said mobile station includes: received power of a reference signal transmitted from sectors and base station apparatuses that said mobile station receives; and channel quality information pertaining to sectors and base station apparatuses that said mobile station receives, and
wherein, the method comprises
on the basis of received power of the reference signals transmitted from sectors and base station apparatuses which the mobile station receives and channel quality information pertaining to sectors and base station apparatuses which said mobile station receives,
in the case where the received power of the signal transmitted from said first sector is equivalent to that of the signal transmitted from a sector or base station apparatus adjacent to said first sector, but there are differences in the channel quality information, using a transmission method for transmitting a signal to said mobile station from one of said first sector and the sector or base station apparatus adjacent to said first sector and not transmitting from the other sector or base station apparatus adjacent to said first sector, or, in the case where the received power and the channel quality information of the signal transmitted from said first sector are equivalent to those of the signal transmitted from a sector or base station apparatus adjacent to said first sector, respectively, using a transmission method for transmitting a signal to said mobile station from both of said first sector and the sectors or base station apparatus adjacent to said first sector.

4. The wireless communication method according to claim 3, wherein contents of said measurement report configuration which are set in advance in said mobile station include number of sectors or base station apparatuses subject to measurement, measurement contents, and measurement intervals.

5. A base station apparatus communicating with a mobile station wirelessly, having a plurality of antennas, a received signal processing unit, a transmitted signal processing unit, a memory, and a control unit, wherein said base station apparatus is configured to:

subdivide the coverage area of the base station apparatus angularly into a plurality of sectors by means of said plurality of antennas, and said control unit is configured to control the communication for each sector with the mobile stations connected with the concerned sector;

transmit in advance a measurement report configuration from a first sector to a mobile station connected with said base station apparatus, the measurement report containing information pertaining to reception condition from sectors and base station apparatuses that said mobile station receives; and when receiving the measurement report from said mobile station, decide, on the basis of contents of said measurement report, any of a plurality of transmission methods for controlling interference from sectors and base station apparatuses other than the sector connecting the mobile station, and notify the decided transmission method to said mobile station;

wherein, the measurement report from said mobile station includes: received power of reference signals transmitted from sectors and base station apparatuses that said mobile station receives; and channel quality information pertaining to sectors and base station apparatuses that said mobile station receives, and wherein, on the basis of received power of the reference signals transmitted from sectors and base station apparatuses which the mobile station receives and channel quality information pertaining to sectors and base station apparatuses which said mobile station receives, in the case where the received power of the signal transmitted from said first sector is equivalent to that of the signal transmitted from a sector or base station apparatus adjacent to said first sector, but there are differences in the channel quality information, use a transmission method for transmitting a signal to said mobile station from one of said first sector and the sector or base station apparatus adjacent to said first sector and not transmitting from the other sector or base station apparatus adjacent to said first sector, or, in the case where the received power and the channel quality information of the signal transmitted from said first sector are equivalent to those of the signal transmitted from a sector or base station apparatus adjacent to said first sector, respectively, use a transmission method for transmitting a signal to said mobile station from both of said first sector and the sector or base station apparatus adjacent to said first sector.

* * * * *